US012394297B1

(12) United States Patent
Papathanassiou

(10) Patent No.: US 12,394,297 B1
(45) Date of Patent: Aug. 19, 2025

(54) TILT-TREE VICINITY ALARM

(71) Applicant: OTW, LLC, Harrisburg, NC (US)

(72) Inventor: Andrew Papathanassiou, Harrisburg, NC (US)

(73) Assignee: AATA, LLC, Harrisburg, NC (US)

( * ) Notice: Subject to any disclaimer, the term of this patent is extended or adjusted under 35 U.S.C. 154(b) by 205 days.

(21) Appl. No.: 17/562,625

(22) Filed: Dec. 27, 2021

Related U.S. Application Data

(60) Provisional application No. 63/131,203, filed on Dec. 28, 2020.

(51) Int. Cl.
*G08B 21/04* (2006.01)
*F16M 13/02* (2006.01)
*G08B 21/10* (2006.01)

(52) U.S. Cl.
CPC ........... *G08B 21/10* (2013.01); *F16M 13/022* (2013.01)

(58) Field of Classification Search
CPC .............................. G08B 21/10; F16M 13/022
See application file for complete search history.

(56) References Cited

U.S. PATENT DOCUMENTS

| 4,403,208 | A | * | 9/1983 | Hodgson | G08B 1/08 455/99 |
| 5,506,565 | A | | 4/1996 | de Leon | |
| 6,037,875 | A | * | 3/2000 | Moser | A01G 23/099 200/61.18 |
| 6,300,581 | B1 | | 10/2001 | Dweck et al. | |
| 9,549,544 | B1 | * | 1/2017 | Millsap | G08B 13/1436 |
| 10,028,452 | B2 | | 7/2018 | Workman et al. | |
| 2004/0263338 | A1 | * | 12/2004 | Katz | G08B 21/10 340/539.12 |
| 2006/0207833 | A1 | * | 9/2006 | Kessinger | A01M 31/02 182/187 |
| 2015/0177596 | A1 | * | 6/2015 | Bergsten | G03B 17/561 248/205.1 |
| 2019/0293233 | A1 | * | 9/2019 | DeVoe | F24C 3/14 |
| 2021/0073692 | A1 | * | 3/2021 | Saha | G08B 21/16 |
| 2021/0264762 | A1 | * | 8/2021 | Lunner | F16P 3/147 |

FOREIGN PATENT DOCUMENTS

| CN | 203258602 U | * | 10/2013 | |
| CN | 207880689 U | * | 9/2018 | |
| CN | 208567872 U | * | 3/2019 | |
| CN | 214200078 U | * | 9/2021 | |
| KR | 1934422 B1 | * | 3/2019 | ........... A01G 17/005 |
| SG | 10201704462 A1 | * | 12/2018 | |
| WO | WO-2018080382 A1 | * | 5/2018 | ................ E01F 9/00 |

* cited by examiner

*Primary Examiner* — An T Nguyen
(74) *Attorney, Agent, or Firm* — Tillman, Wright & Wolgin; Z D. Wright; David R. Higgins

(57) ABSTRACT

A tilt-tree vicinity alarm has an operational unit and a mounting system. The operational unit has a tilt sensor adapted to serve as or control a switch in an electric circuit and at least one instantaneous vicinity alarm that is activated by the tilt sensor switch and is perceptible to individuals in the immediate vicinity of the operational unit. The mounting system supports the operational unit and is adapted for disposition on a tree.

14 Claims, 15 Drawing Sheets

TILT-TREE VICINITY ALARM

CROSS-REFERENCE TO RELATED APPLICATION

The present application is a U.S. nonprovisional patent application of, and claims priority under 35 U.S.C. § 119(e) to, U.S. provisional patent application Ser. No. 63/131,203, filed Dec. 28, 2020 and entitled "TILT-TREE VICINITY ALARM," which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to tree alarms, and, in particular, to instantaneous on-site alarms related to falling trees.

Background

Trees are frequently desired around houses and in other areas for many reasons, including providing shade (thereby reducing cooling costs), improved aesthetics, their role in fighting climate change by absorbing and storing carbon dioxide, and the like. However, as trees age or are damaged by insects, disease, construction, or the like, there is an increased risk that limbs may break off, or that the entire tree may fall over. In many areas of the United States and around the world, trees grow large enough that they may cause significant damage or even injury when they do. Thus, the proper care and monitoring of trees, particularly large trees, has long been an important task for homeowners and others. However, tree monitoring is typically limited to visual inspection only, which is difficult to carry out on a continuous basis, when visibility is limited (such as at night), or when away from the trees.

Formal guidelines or recommendations exist for assessing these risks. For example, green industry professionals who possess the International Society of Arboriculture (ISA) Tree Risk Assessment Qualification make tree risk assessments based on a number of factors, including the likelihood of failure, the likelihood of the hazard striking a target, and the consequences of failure. These factors are evaluated and a risk rating of "Extreme," "High," "Moderate," or "Low" is assigned and used to determine the proper mitigation efforts, which for extreme or high risks may mean removal of the tree entirely. Because the steps to be taken are dependent upon the risk, it would be useful to lower the risk rating through improved tree monitoring, and to avoid tree removal when possible.

Although it is normal to be concerned about the risk of damage and injury caused by falling trees and their branches, some people suffer from dendrophobia (or related phobias), which is the uncontrollable and often irrational fear of trees. Symptoms include feelings of dread, anxiety, disorientation, weakness, and panic. The fear of trees is often something that is closely associated with the fear of the dark. Dendrophobia is much more prominent after the sun goes down because this is when it becomes difficult to see trees and judge their position and movements. Notably, although perhaps not clinical sufferers from dendrophobia, many people have at least mild symptoms of dendrophobia. For anyone with even mild symptoms, it would be useful to provide means for reassurance that particular trees are safe, or are not in imminent danger of falling.

One type of tree monitoring that has been developed involves the use of monitoring devices with tilt sensors to trigger remote communications for the purpose of alerting landowners at a distance that trees have fallen. When a tree equipped with such a monitoring device falls, a message or signal is transmitted and received remotely so that further action may be taken by the owner. These are commonly used by lumber companies and other forest management entities to provide alerts that lumber poaching may be occurring. Unfortunately, these devices do not provide the type of instantaneous warning that is necessary to alert unsuspecting homeowners, passersby, and even pets and other animals that a tree is in the process of falling or has changed position significantly and may be about to fall. Indeed, the alerts are intended for landowners or land management companies that are located off-site, and often at considerable distance, from the tree premises. Furthermore, these devices are generally camouflaged and are intended to be inconspicuous so as to avoid easy detection by tree poachers (in which case the poachers would simply avoid the monitor-equipped tree(s)).

Thus, a need exists for a tree alarm for use with nearby trees to provide monitoring, risk reduction, mitigation, and the like, and whose presence serves as a prominent visual symbol to provide relief to residents and to passersby that may be suffering from dendrophobia and general anxiety. One or more of the foregoing needs and/or other needs may be addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of tree alarms, the present invention is not limited to use only in tree alarms, enclosures, and the like, as will become apparent from the following summaries and detailed descriptions of aspects, features, and one or more embodiments of the present invention Broadly defined, the present invention according to one aspect relates to a tilt-tree vicinity alarm, including: an operational unit, having a tilt sensor having an orientation and adapted to serve as or control a switch in an electric circuit, and at least one instantaneous vicinity alarm device that is triggered by operation of the tilt sensor switch and is perceptible to individuals in the immediate vicinity of the operational unit; and a mounting system, supporting the operational unit, adapted for prominent visual disposition on a tree.

In a feature of this aspect, the operational unit is calibrated such that a vertical orientation is defined for the tilt sensor, such that a range of acceptable deviation from the vertical orientation is defined, and such that operation of the tilt sensor switch triggers the at least one instantaneous vicinity alarm when the tilt sensor detects that the tilt sensor orientation is outside the range of acceptable deviation from the vertical orientation. In another feature of this aspect, the operational unit is calibrated such that the range of acceptable deviation from the vertical orientation accommodates normal tree movement, but not tree movement caused by high wind events.

In further features, the at least one instantaneous vicinity alarm device includes a visual alarm; the visual alarm is a light that projects in multiple directions so as to attract the attention of the individuals in the immediate vicinity of the operational unit; and/or the visual alarm is a light, and the light flashes so as to attract the attention of the individuals in the immediate vicinity of the operational unit.

In still further features, the at least one instantaneous vicinity alarm device includes an audible alarm; the audible alarm is a speaker that projects sound in multiple directions so as to attract the attention of the individuals in the immediate vicinity of the operational unit; and/or the audible alarm sounds intermittently so as to attract the attention of the individuals in the immediate vicinity of the operational unit.

In another further feature, the tilt sensor utilizes an accelerometer.

In another further feature, the tilt sensor utilizes a gyroscope.

In another further feature, the tilt-tree vicinity alarm further includes a timer that controls an activation period for the at least one instantaneous vicinity alarm device.

In another further feature, the operational unit, including the tilt sensor, is housed in a weatherproof container.

In still further features, the mounting system includes a frame structure and a support platform, the frame structure is adapted for mounting on a tree trunk, the support platform is carried on the frame structure, and the operational unit is mounted on the support platform; the operational unit is calibrated to define the vertical orientation for the tilt sensor by adjusting the mounting system in one or more dimensions; and/or the mounting system includes a shield to protect the operational unit from sunlight and falling or blowing debris.

In another further feature, the mounting system includes a strap system to provide non-intrusive attachment to the tree.

In another further feature, the tilt-tree vicinity alarm further includes a transmitter, connected to the tilt sensor switch, that sends an alert signal to a local receiver when triggered by the operation of the tilt sensor switch.

Broadly defined, the present invention according to another aspect relates to a tilt-tree vicinity alarm system, including: an operational unit, having a tilt sensor having an orientation and adapted to serve as or control a switch in an electric circuit, a first instantaneous vicinity alarm device that is triggered by operation of the tilt sensor switch and generates an alarm that is perceptible to individuals in the immediate vicinity of the operational unit, and a transmitter, connected to the tilt sensor switch, that instantaneously sends a short-range alert signal when triggered by operation of the tilt sensor switch; a mounting system, supporting the operational unit, attached to the tree in prominent visual disposition thereon, the tree being located on a real estate property; and a second, separate, alarm device, located elsewhere on the real estate property, that generates an instantaneous alarm, perceptible to individuals in the immediate vicinity of the separate alarm device when the short-range alert signal is received.

In a feature of this aspect, the operational unit is calibrated such that a vertical orientation is defined for the tilt sensor, such that a range of acceptable deviation from the vertical orientation is defined, and such that operation of the tilt sensor switch triggers the at least one instantaneous vicinity alarm and the transmitter when the tilt sensor detects that the tilt sensor orientation is outside the range of acceptable deviation from the vertical orientation.

In another feature of this aspect, the second alarm device is located inside a house on the real estate property; and/or the second alarm device is located inside a house on an adjacent real estate property.

Broadly defined, the present invention according to another aspect relates to a method of instantaneously alerting individuals in the immediate vicinity of a tree of an imminent tree-falling danger, including the steps of: attaching a mounting system to a tree; supporting an operational unit on the mounting system, the operational unit having a tilt sensor having an orientation and adapted to serve as or control a switch in an electric circuit, and an instantaneous vicinity alarm device that is triggered by operation of the tilt sensor switch; establishing a vertical orientation for the tilt sensor; thereafter, monitoring, via the tilt sensor, an orientation thereof relative to the vertical orientation; upon detecting, by the tilt sensor, that the orientation of the tilt sensor deviates from the vertical orientation by a predetermined amount, instantaneously triggering the instantaneous vicinity alarm device; and via the instantaneous vicinity alarm device, generating an alarm that is perceptible to individuals in the immediate vicinity of the operational unit when the instantaneous vicinity alarm device is triggered.

In a feature of this aspect, the method further includes a step of defining a range of acceptable deviation from the vertical orientation, and the steps of monitoring and detecting, by the tilt sensor, involve determining whether the tilt sensor has an orientation that is outside the range of acceptable deviation from the vertical orientation. In another feature of this aspect, the step of defining a range of acceptable deviation includes calibrating the operational unit such that the range of acceptable deviation from the vertical orientation accommodates normal tree movement, but not tree movement caused by high wind events.

In further features, the instantaneous vicinity alarm device includes a visual alarm, and the step of generating an alarm includes activating the visual alarm; the visual alarm is a light, and the step of generating an alarm includes projecting light in multiple directions so as to attract the attention of the individuals in the immediate vicinity of the operational unit; and/or the visual alarm is a light, and the step of generating an alarm includes flashing the visual alarm so as to attract the attention of the individuals in the immediate vicinity of the operational unit.

In still further features, the instantaneous vicinity alarm device includes an audible alarm, and the step of generating an alarm includes activating the audible alarm; the audible alarm is a speaker, and the step of generating an alarm includes projecting sound in multiple directions so as to attract the attention of the individuals in the immediate vicinity of the operational unit; and/or the audible alarm is a speaker, and the step of generating an alarm includes sounding the speaker intermittently so as to attract the attention of the individuals in the immediate vicinity of the operational unit.

In another further feature, the steps of monitoring and detecting the orientation of the tilt sensor include using an accelerometer.

In another further feature, the steps of monitoring and detecting the orientation of the tilt sensor include using an gyroscope.

In another further feature, the method further includes a step of controlling, via a timer, an activation period for the instantaneous vicinity alarm device.

In another further feature, the method further includes a step of housing the operational unit, including the tilt sensor, in a weatherproof container.

In still further features, the mounting system includes a frame structure and a support platform, the step of attaching the mounting system to the tree includes attaching the frame structure to a trunk of the tree, and the method further comprises the steps of carrying the support platform on the frame structure and mounting the operational unit on the support platform; and/or the step of establishing a vertical orientation for the tilt sensor includes calibrating the operational unit to define the vertical orientation for the tilt sensor by adjusting the mounting system in one or more dimensions.

In another further feature, the mounting system includes a strap system, and the step of attaching the mounting system to the tree includes using the strap system to provide non-intrusive attachment to the tree.

In still further features, the operational unit further includes a transmitter, connected to the tilt sensor switch, and the method further includes a step, upon detecting that the orientation of the tilt sensor deviates from the vertical orientation, by the predetermined amount, of instantaneously sending a short-range alert signal to a local receiver; the method further includes a step of generating, via a separate alarm device, of generating an alarm that is perceptible to individuals in the immediate vicinity of the separate alarm device when the short-range alert signal is received; the tree is located on a real estate property, and the method further comprises a step of locating the separate alarm device elsewhere on the real estate property; the step of locating the separate alarm device includes locating the separate alarm device inside a house on the real estate property; and/or the tree is located on a first real estate property, and the method further includes a step of locating the separate alarm device on a second real estate property, wherein the second real estate property is adjacent to the first real estate property.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
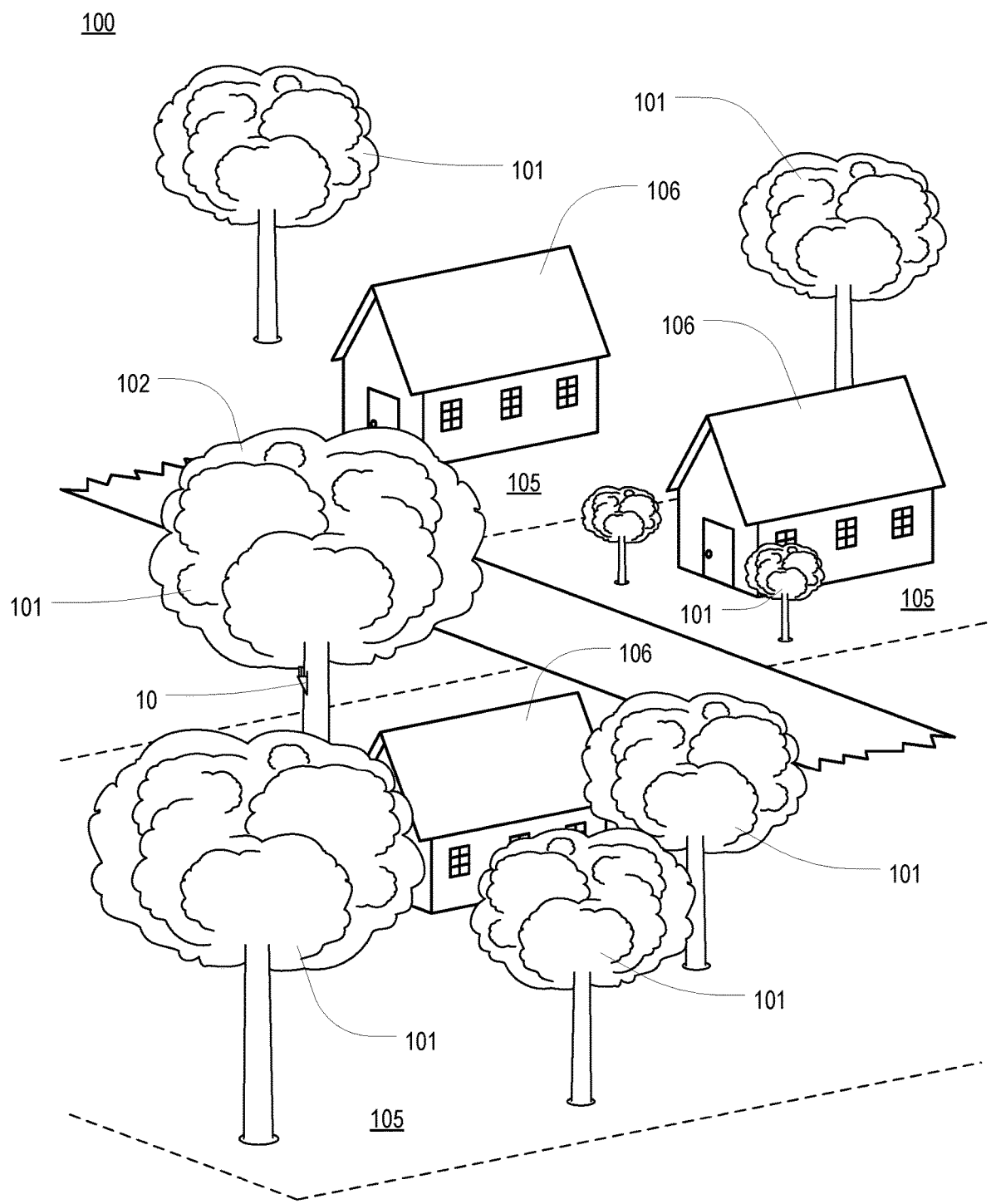
FIG. 1 is an exemplary environmental view of a representative residential neighborhood in which a tree is equipped with a tree-tilt vicinity alarm in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term-differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

In many neighborhoods, and particularly in older residential neighborhoods, a variety of trees are interspersed with houses and other buildings. In this regard, FIG. 1 is an environmental view of a representative residential neighborhood 100 in which one tree 101 is equipped with a tree-tilt vicinity alarm 10 in accordance with one or more preferred embodiments of the present invention. In the representative neighborhood, three residential lots 105 are shown, each with a home 106 and one or more trees 101. It will be appreciated that the various trees 101 in a neighborhood 100 may be of a wide variety of sizes, types, ages, and the like. Furthermore, it will be appreciated that trees are likewise disposed in a wide variety of real estate properties in alternative locales, including along city streets, in municipal parks, on farms, and many others.

Figure 2:
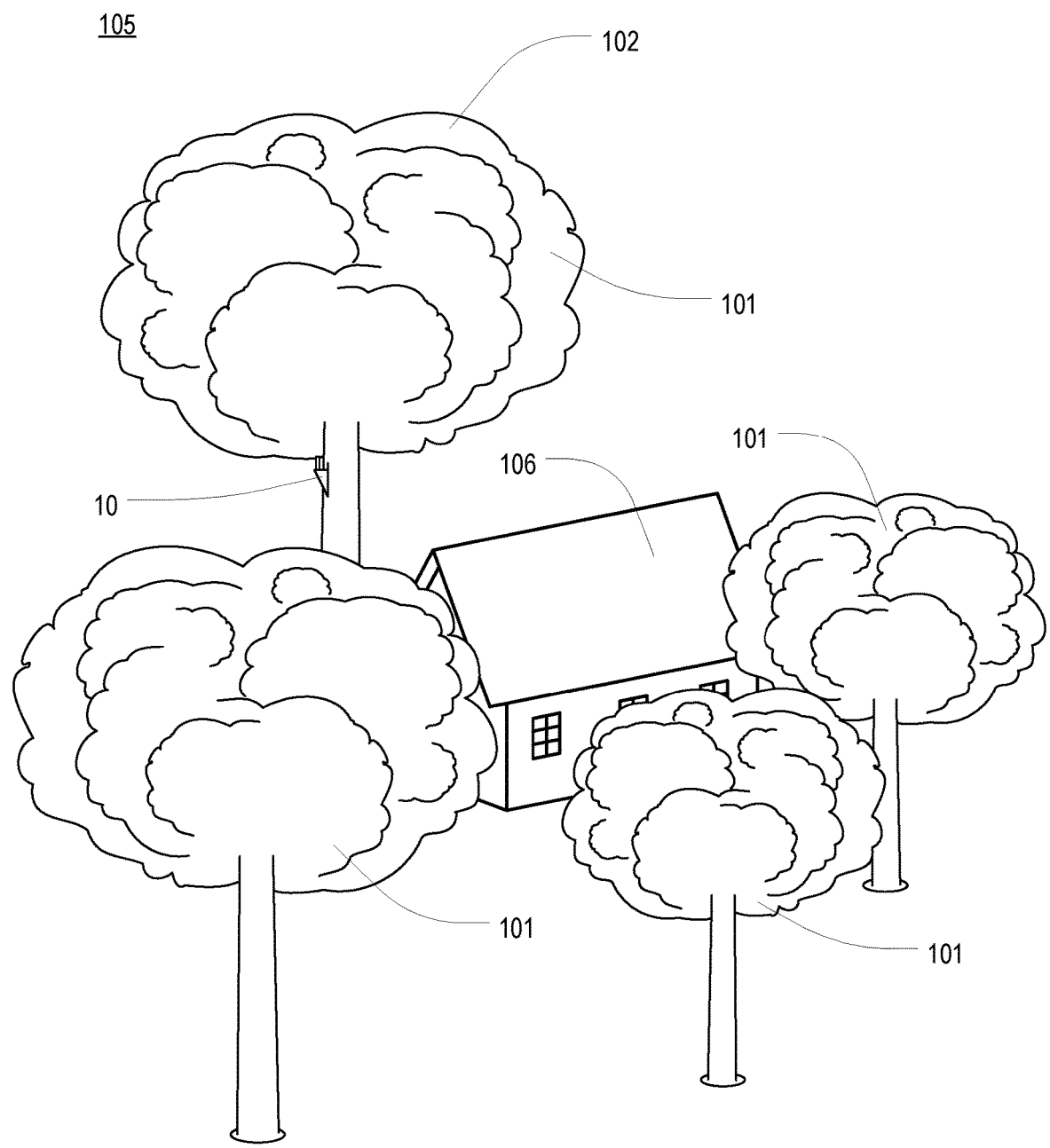
FIG. 2 is an enlarged environmental view of one of the residential lots of FIG. 1.

FIG. 2 is an enlarged environmental view of one of the residential lots 105 of FIG. 1. On this particular lot 105, four trees 101 are shown, including two larger trees and two smaller trees. One of the larger trees and one of the smaller trees are fairly close to the house, and thus might be of greater concern to the resident than trees more distant from the house 106. Of the closest trees, the larger tree 102 may be of particular concern because of its size and proximity, and thus a tree-tilt vicinity alarm 10 is shown installed thereon. It will be appreciated, however, that various factors may be taken into consideration in choosing whether to install such alarms 10, including the size, age, and health of the trees 101, their proximity to a house 106 or other building, the lot or tree owner's level of concern or anxiety, the existence of a duty of care owed by the lot or tree owner, and other factors. Notably, the decision might be made by the lot or house owner, a resident, a tenant, a neighbor (presumably with authorization), a municipality, or the like.

Figure 3:
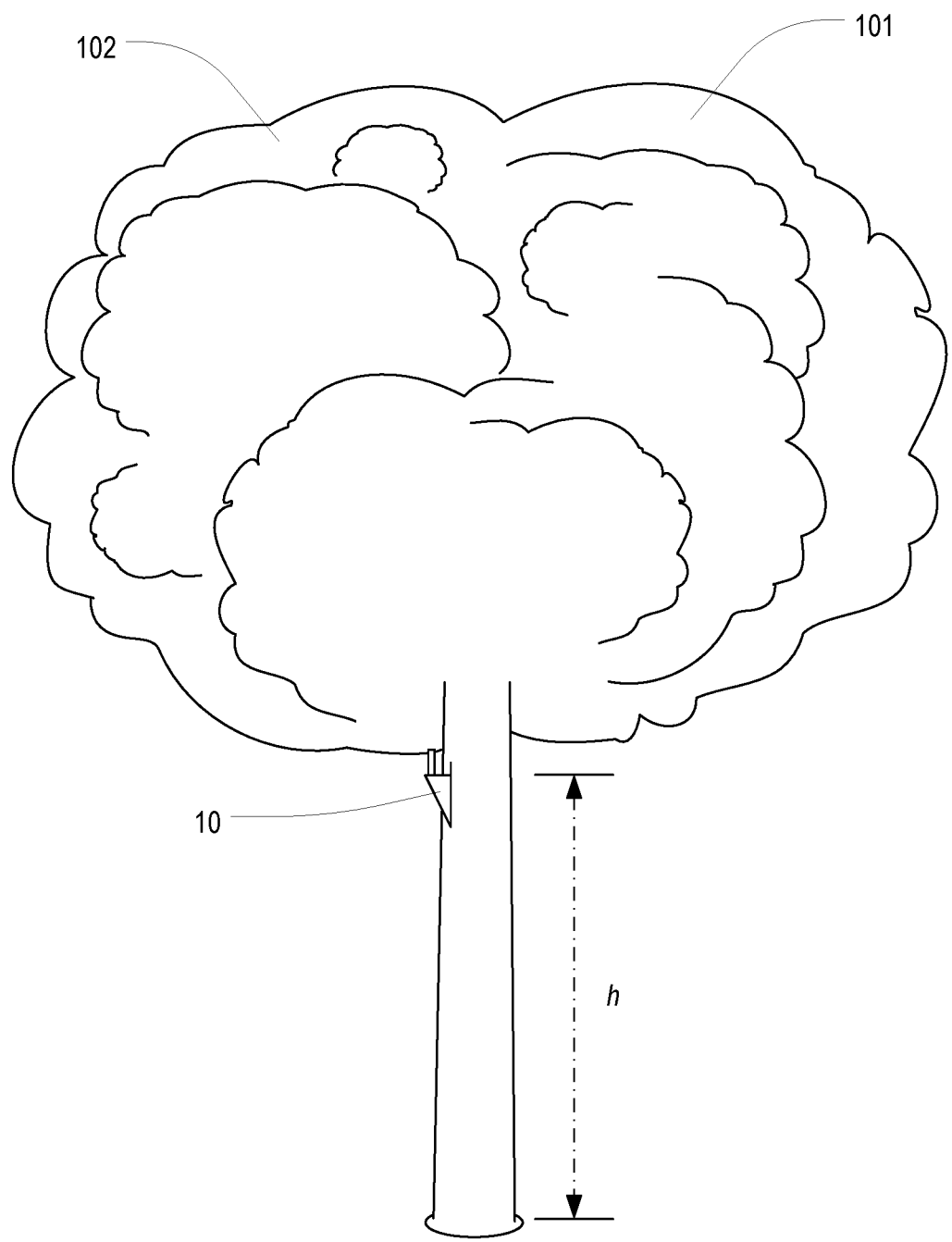
FIG. 3 is a further enlarged view of the tree and tilt-tree vicinity alarm of FIG. 2.

FIG. 3 is a further enlarged view of the tree 102 and tilt-tree vicinity alarm 10 of FIG. 2. The alarm 10 is shown installed on the trunk of the tree 102 at a height h above the ground. Because a given tree is least likely to sway or otherwise move at its base, close to the ground, it is preferred for the alarm 10 to be installed at a higher location. However, the installer may find it difficult or impossible to install the alarm 10 near the top of a tree 101, and thus may choose a more accessible location.

Figure 4:
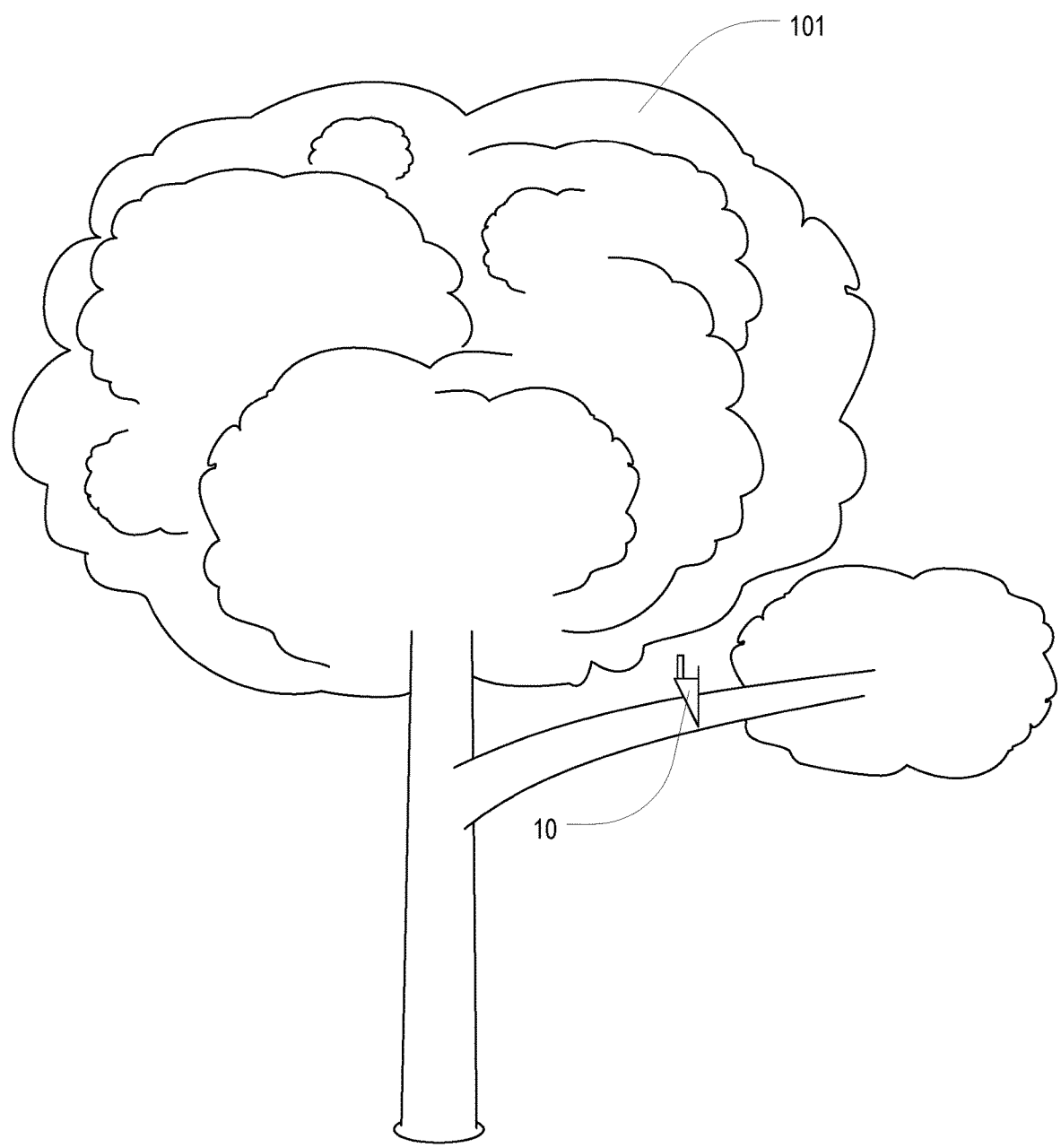
FIG. 4 is a view of a tree having a tilt-tree vicinity alarm installed on a branch or limb thereof.

Notably, the installation location need not be on the trunk of the tree 102. For example, FIG. 4 is a view of a tree 101 having a tilt-tree vicinity alarm 10 installed on a branch or limb thereof. The installer may choose to install the alarm 10 on the limb for convenience, or may choose to do so in order to provide specific monitoring for the limb, rather than the main trunk of the tree 101. If desired, an alarm may be mounted and used in other specific monitoring locations, such as on one trunk of a tree 101 with a bifurcated trunk.

Figure 5A:
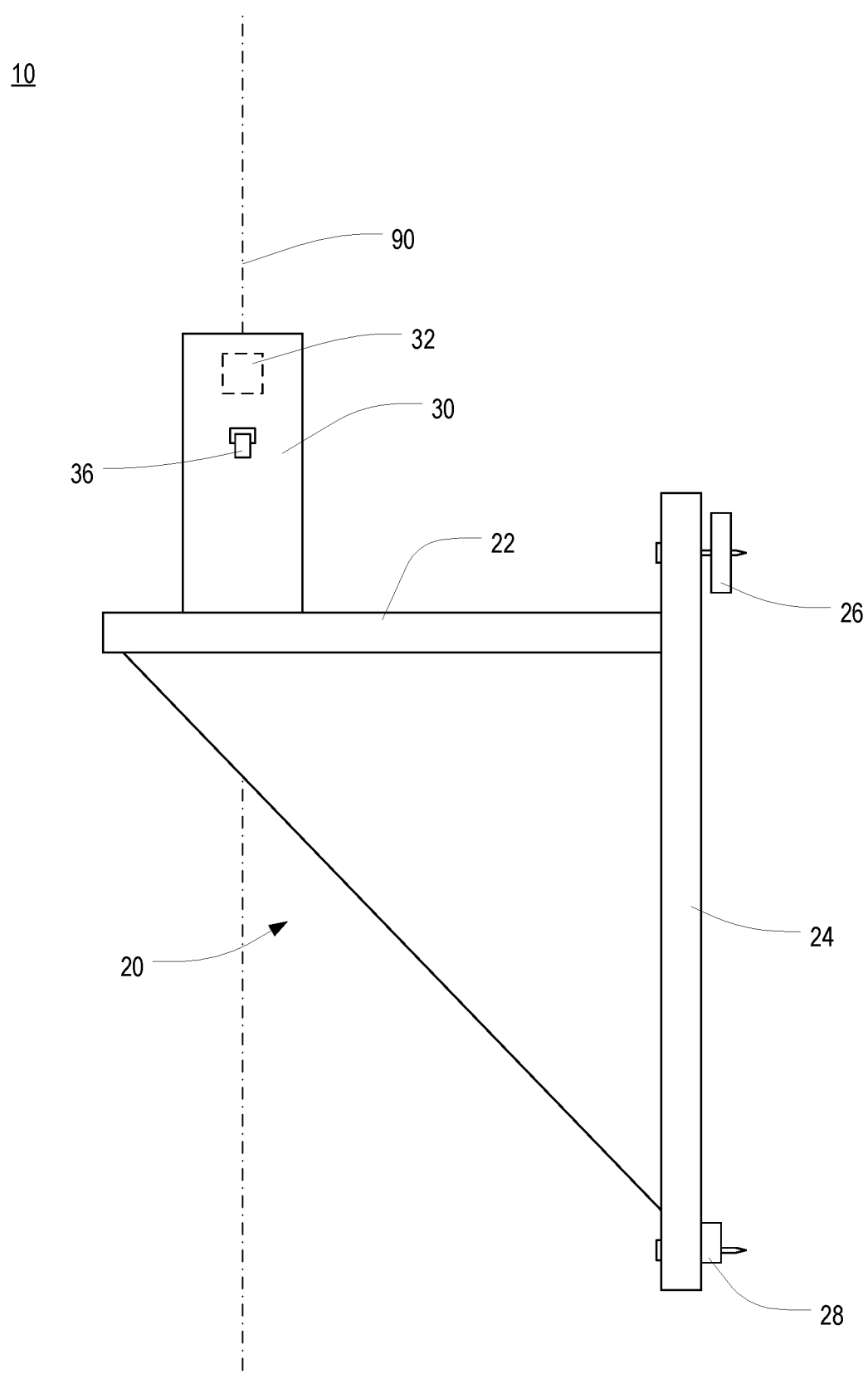
FIGS. 5A and 5B are a side schematic view and a front schematic view, respectively, of the tilt-tree vicinity alarm of FIG. 3.
Figure 5B:
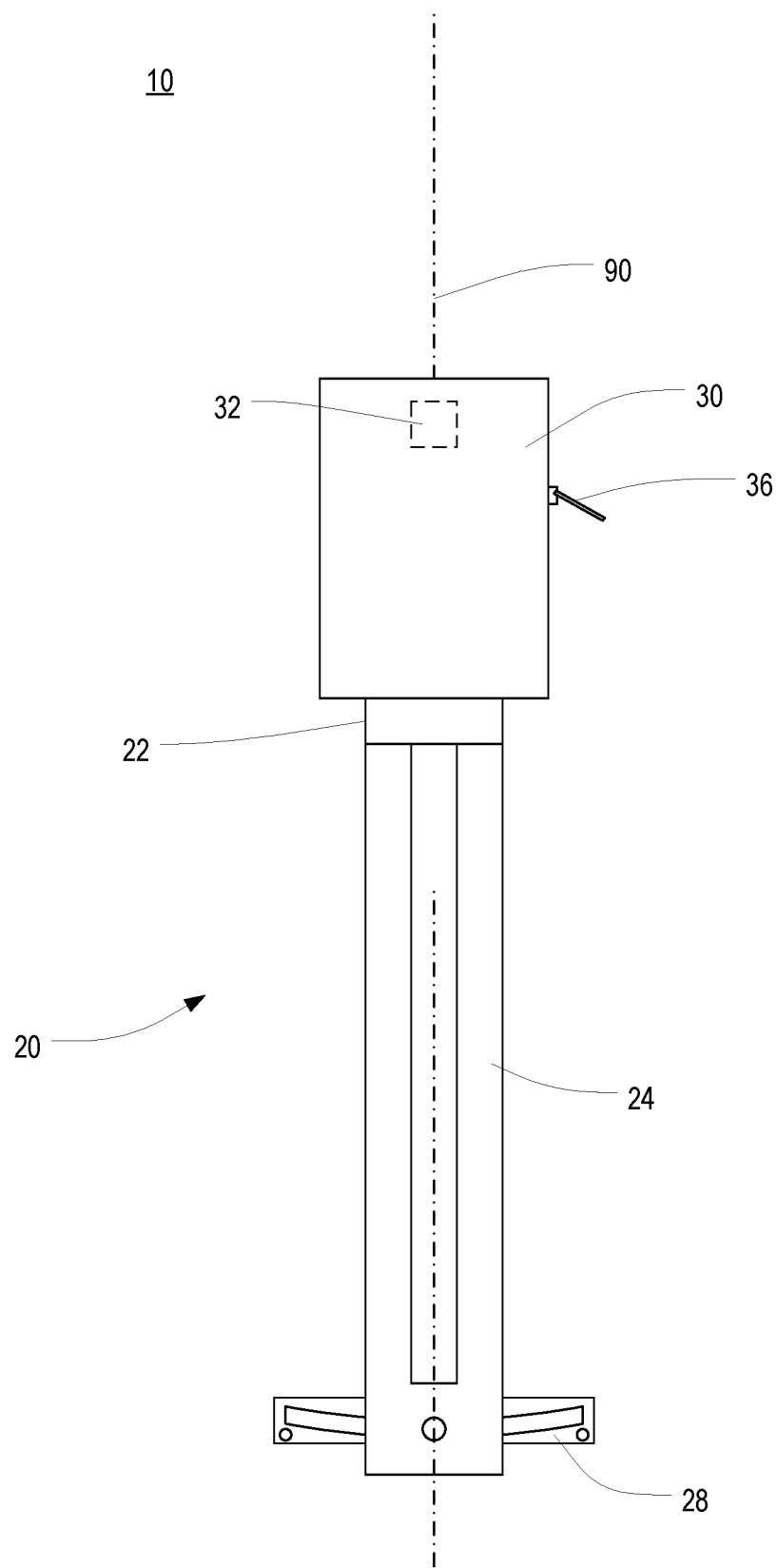
Figure 6:
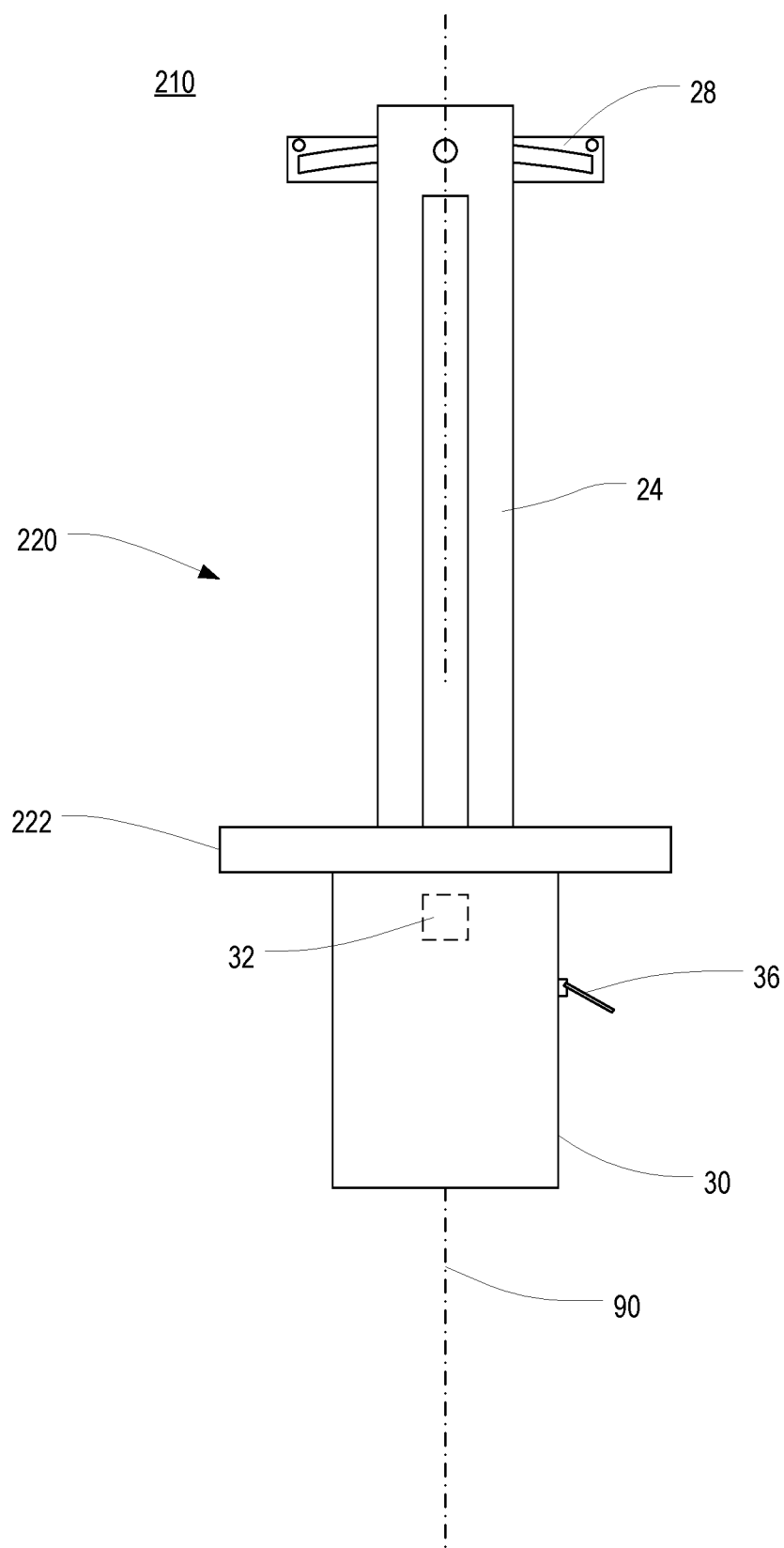
FIG. 6 is a front schematic view of an alternative tilt-tree vicinity alarm in accordance with one or more preferred embodiments of the present invention.

FIGS. 5A and 5B are a side schematic view and a front schematic view, respectively, of the tilt-tree vicinity alarm 10 of FIG. 3. As shown therein, the alarm 10 includes an operational unit 30 supported by a mounting system 20. In this exemplary embodiment, the mounting system 20 includes a support platform 22 and a frame structure 24. Alternatively, the mounting system 20 may further include protection, shade, or both for the operational unit 30. In this regard, FIG. 6 is a front schematic view of an alternative tilt-tree vicinity alarm 210 in accordance with one or more preferred embodiments of the present invention. As shown therein, the alarm 210 includes an operational unit 30 supported by a mounting system 220. In this alternative embodiment, the mounting system 220 includes a support platform 222 and a frame structure 24, wherein the support platform 222 provides a mounting interface as well as a measure of protection or shielding for the operational unit from falling/blowing debris, direct heat of the sun, and/or the like.

The support platform 22,222 carries the operational unit 30 and is itself supported by the frame structure 24, which may be mounted to the trunk or other portion of a tree 101. In at least some embodiments, proper operation of the alarm 10 is dependent upon the operational unit 30 being installed such that a tilt sensor 32 (sometimes referred to as an inclinometer) disposed therein is oriented properly relative to a vertical axis 90. This may be accomplished by providing suitable adjustability in the mounting system 20,220. In this regard, the mounting system 20,220 may include one or more tilt adjustment mechanism. For example, in the simple illustrated embodiment, a first tilt adjustment mechanism 26 controls the spacing of the upper end of the mounting system 20,220 from the trunk, while a second tilt adjustment mechanism provides side-to-side adjustment of the lower end of the mounting system 20,220, wherein the two adjustment mechanisms 26,28 together enable the orientation of the operational unit 30 to be adjusted in two different axes (effectively, the y-axis and the z-axis). However, a wide variety of alternative adjustment mechanisms or systems may be used. Furthermore, the adjustment mechanisms may alternatively be utilized to adjust the orientation of the operational unit 30 on the support platform 22,222, adjustment mechanisms may be provided within the operational unit 30 to adjust the orientation of the tilt sensor 32 relative to the rest of the operational unit 30, the tilt sensor 32 itself may include an adjustment mechanism, or the like. Also, in various embodiments, the mounting system 20,220 may be designed to attach to the trunk via screws or other intrusive mechanisms, or may be designed to attach without penetrating the external surfaces of the trunk, such as via a strap system like those used in some tree-mounted trail camera designs.

Figure 7:
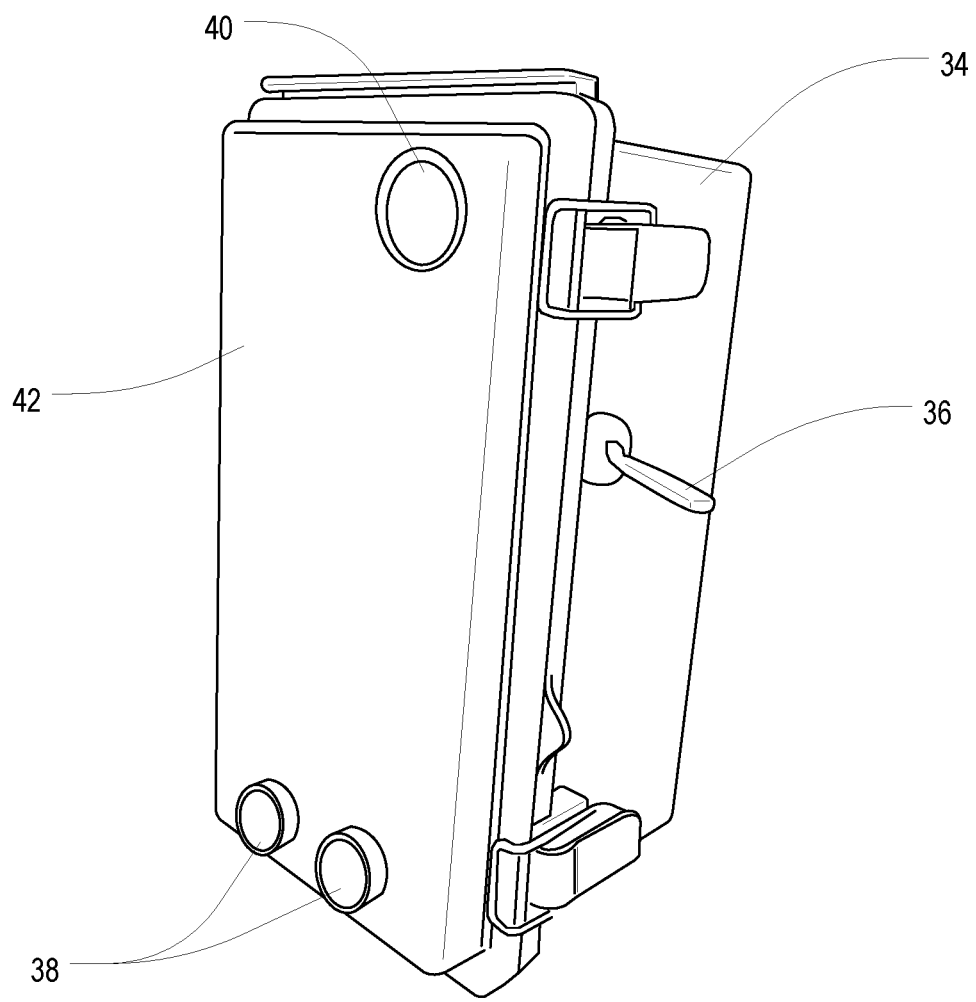
FIG. 7 is a perspective view of the operational unit of FIGS. 5A and 5B.

FIG. 7 is a perspective view of the operational unit 30 of FIGS. 5A and 5B. As shown therein the operational unit 30 includes a weatherproofed housing 34, an external on/off switch 36, and one or more vicinity alarm devices 38,40, such as one or more light 38 and speaker 40. The light 38 is preferably bright enough to be seen from across the lot 105, across the street, and/or, in at least some cases, from inside the house 106, and preferably projects light, and does so in multiple directions, so as to attract the attention of residents and passersby. Similarly, the speaker 40 is preferably loud enough to be heard from across the lot 105, across the street, and/or, in at least some cases, from inside the house 106, and preferably projects sound, and does so in multiple directions, so as to attract the attention of residents and passersby. In the illustrated embodiment, the tilt sensor 32 itself is contained within the housing 34, but in other embodiments a tilt sensor 32 may itself be weatherproofed (such as in its own protective, weatherproof container) and located external to a housing, which may make it easier to position and orient the sensor 32 properly. The housing 34 preferably includes a cover 42 to permit access to the interior and the components contained therein, with the cover 42 being sealed to provide sufficient weatherproofing for such components. Of course, it will be appreciated that a wide variety of housings, both off-the-shelf and purpose-built, may alternatively be utilized.

Figure 8:
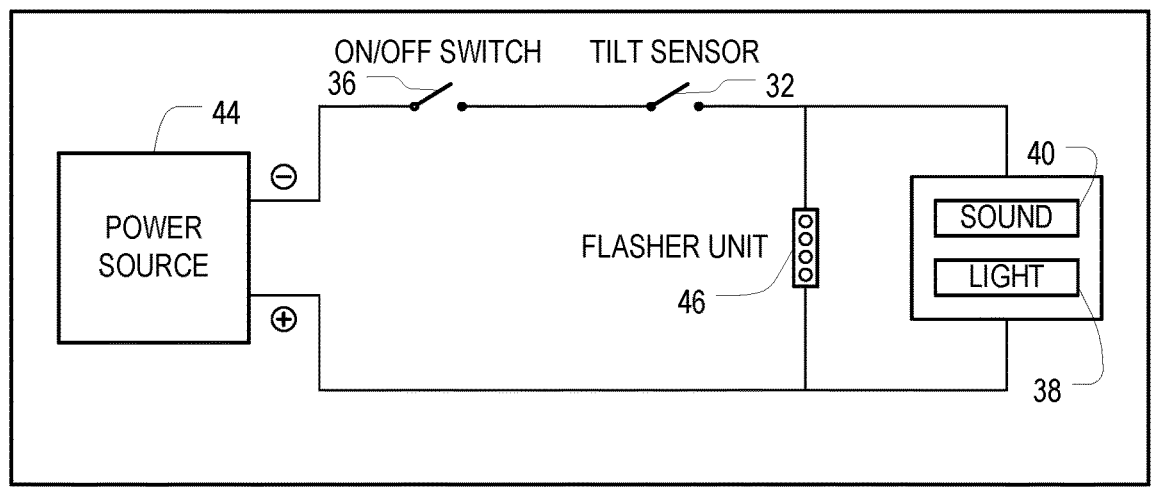
FIG. 8 is a general circuit diagram of the primary components of the operational unit of FIG. 7.

FIG. 8 is a general circuit diagram of the primary components of the operational unit 30 of FIG. 7. As shown therein, a power supply 44 is used to power one or more circuits, which include the tilt sensor 32, the alarm devices 38,40, and a flasher unit 46 for one or both alarm devices such that they light or sound intermittently. The power supply 44 is preferably a battery, but may be a wired power source of conventional household voltage or low voltage. The circuit(s) are activated via the on/off switch 36 or other activation means. Once the circuit is activated, the tilt sensor 32 is used to close the circuit, thereby powering the alarm devices 38,40. More particularly, the tilt sensor 32 serves as a switch, wherein the switch is "off" when the sensor 32 is oriented vertically (or within a range thereof) but is "on" when the orientation of the sensor changes so as to longer be vertical (or falls outside of the range). In this regard, it will be appreciated that the "orientation of the sensor" refers to an orientation that is detected, determined, or measured by the sensor. Sensors/switches suitable for use as or in the tilt sensor 32 include, without limitation, mercury switches, mass/hammer switches, mercury reed switches, force balance sensors, accelerometers, gyroscopes, solid state MEMS sensors, electrolytic sensors, capacitive tilt sensors, and various other sensors and switches, including those of solid state/electronic construction. In at least some embodiments, the tilt sensor 32 is a single omnidirectional sensor, but in other embodiments a plurality of sensors, each detecting orientation in a different dimension, may be substituted. Also, it will be appreciated that in some cases, a tilt sensor may be incorporated into a circuit such that the tilt sensor switch is normally closed, and the circuit is energized, when the sensor is oriented vertically, and is opened, thereby de-energizing the circuit, when the orientation deviates sufficiently from vertical. However, such arrangement may require further circuitry in order to properly manage operation of the alarm devices 38,40.

Figure 9:
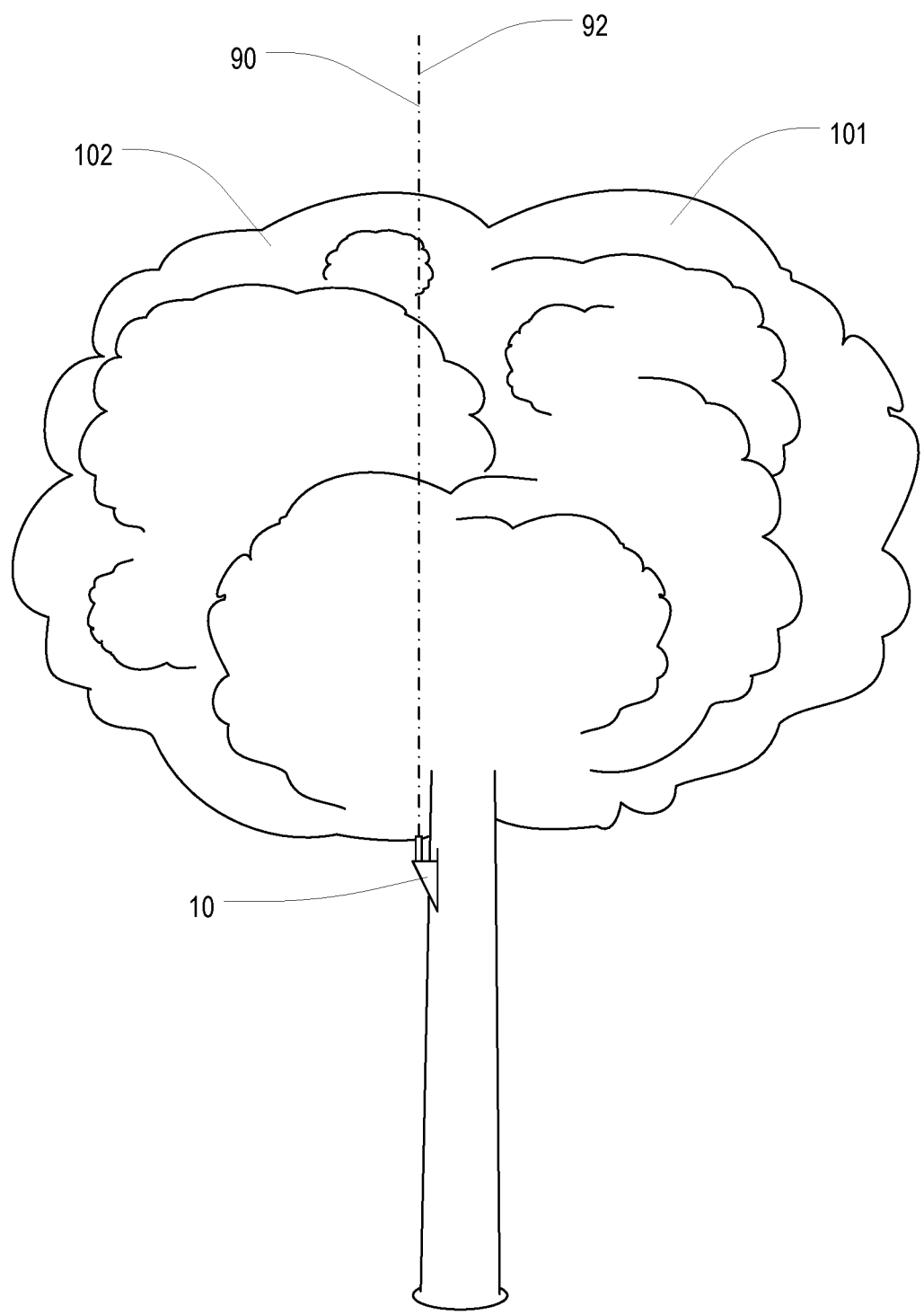
FIG. 9 is a view of the tree and tilt-tree vicinity alarm of FIG. 3 illustrating the vertical orientation of the tilt-tree vicinity alarm on the tree.
Figure 10:
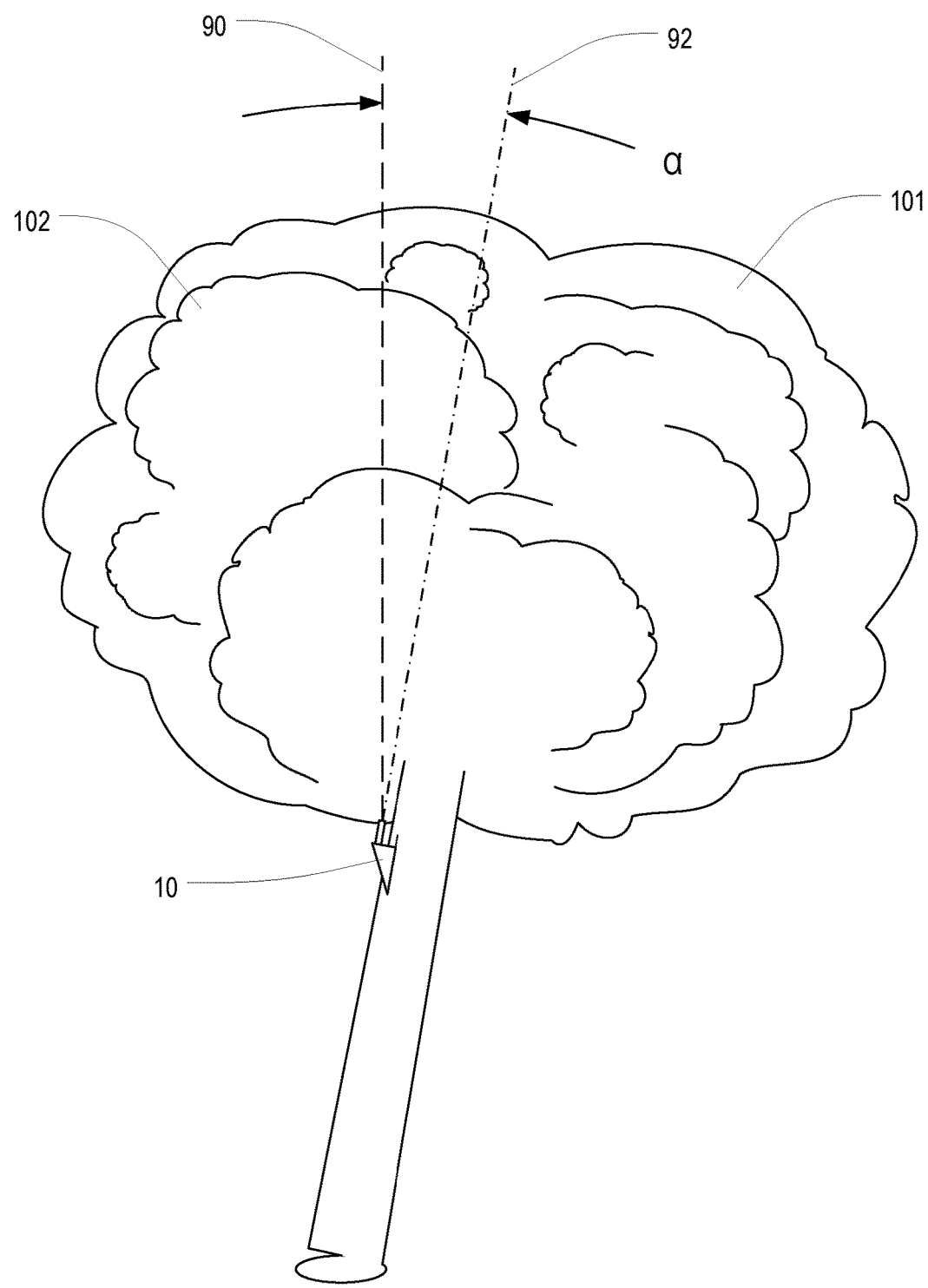
FIG. 10 is a view of the tree and tilt-tree vicinity alarm of FIG. 9 illustrating a deviation of the tilt-tree vicinity alarm from the proper orientation.

The tilt sensor 32 is designed to trigger, thereby turning on the switch and closing the circuit, when the orientation of the sensor 32 deviates from vertical by a particular amount. This is illustrated in FIGS. 9 and 10, wherein FIG. 9 is a view of the tree 102 and tilt-tree vicinity alarm 10 of FIG. 3 illustrating the proper vertical orientation of the tilt-tree vicinity alarm 10 on the tree, and FIG. 10 is a view of the tree 102 and tilt-tree vicinity alarm 10 of FIG. 9 illustrating a deviation of the tilt-tree vicinity alarm 10 from the proper orientation. In FIG. 9, the axis 92 of the tilt sensor 32 is perfectly or nearly perfectly oriented vertically, while in FIG. 10, the axis 92 of the tilt sensor 32 is tilted or inclined, relative to vertical, by an angular amount a. When installed, the tilt-tree vicinity alarm 10 is adjusted or calibrated as described previously so as to establish the vertical orientation as illustrated in FIG. 9, with the vertical orientation being based on the tree under normal conditions. Once such orientation is established, so long as the angular inclination a remains less than the trigger value, the tilt sensor switch remains open, and the alarms are not activated. If the angular inclination a reaches or exceeds the trigger value, however, then the tilt sensor switch closes and the alarms are activated. In some embodiments, the trigger value is fixed by the tilt sensor manufacturer, while in others it may be adjusted or calibrated by a user. In some embodiments, the particular trigger value may be around 10 degrees, but if the value is adjustable, a user may find it advantageous to adjust the value based on natural movement of the tree. In other words, a first tree 101 might naturally sway up to 13 degrees from vertical, while a second tree 101 might only sway 8 degrees from vertical under normal conditions; a user might choose to set the trigger value for the first tree at 14 degrees, and to set the trigger value for the second tree 101 at 9 degrees.

Figure 11:
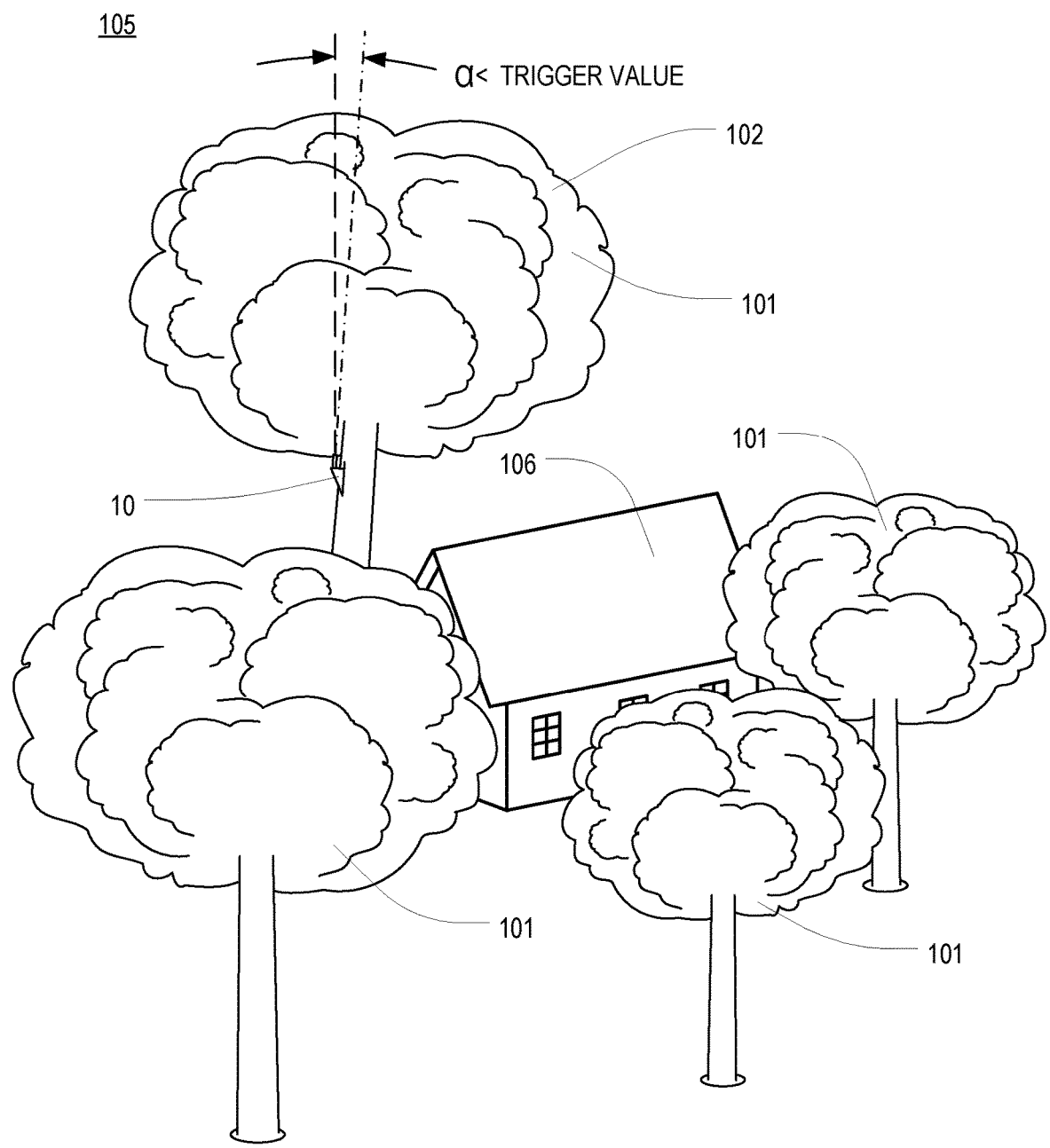
FIG. 11 is an environmental view similar to that of FIG. 2 but illustrating the alarm-equipped tree deviating slightly from the vertical orientation.
Figure 12:
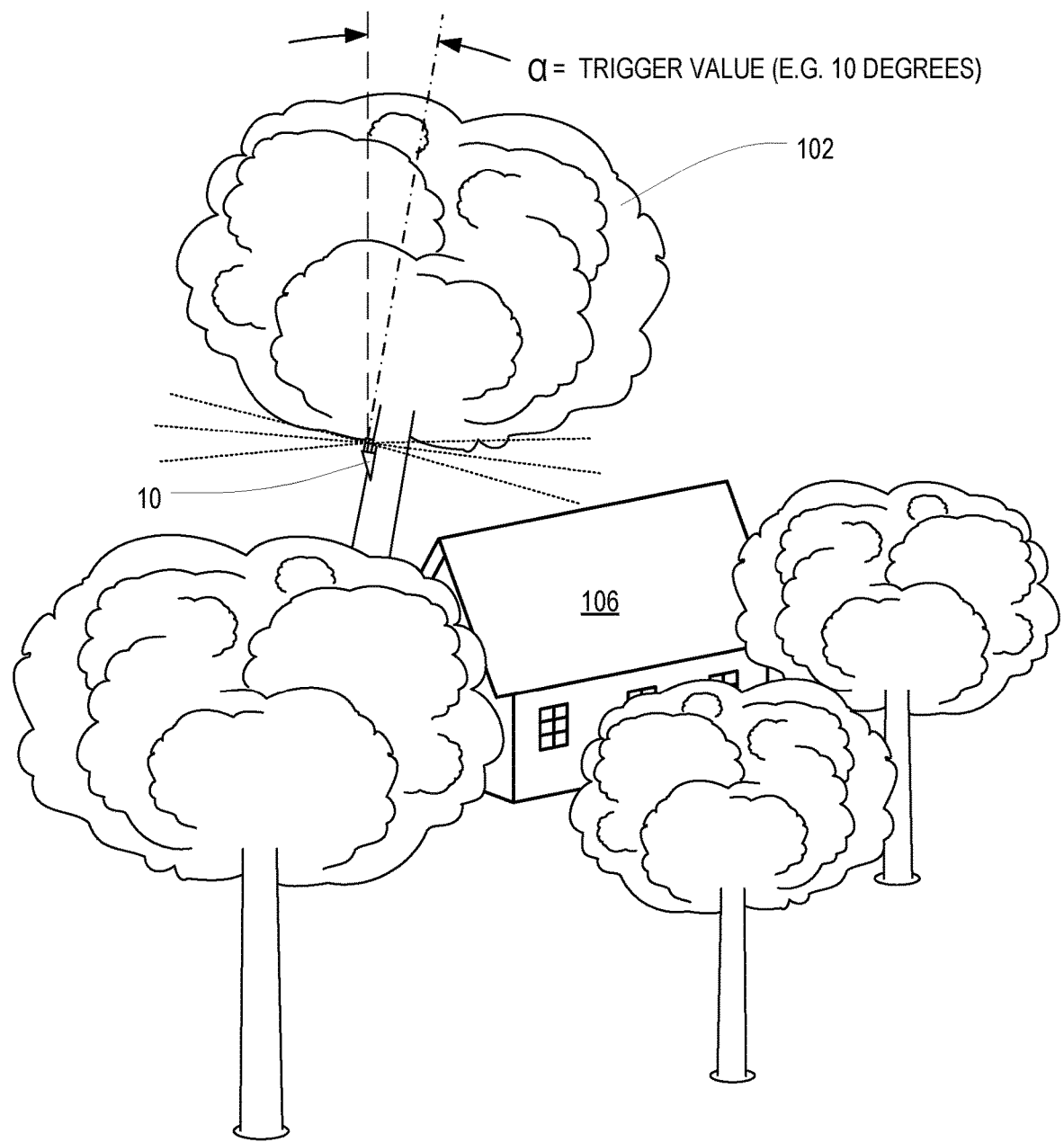
FIG. 12 is an environmental view similar to that of FIG. 11 but illustrating the alarm-equipped tree leaning sufficiently to trigger the alarm.
Figure 13:
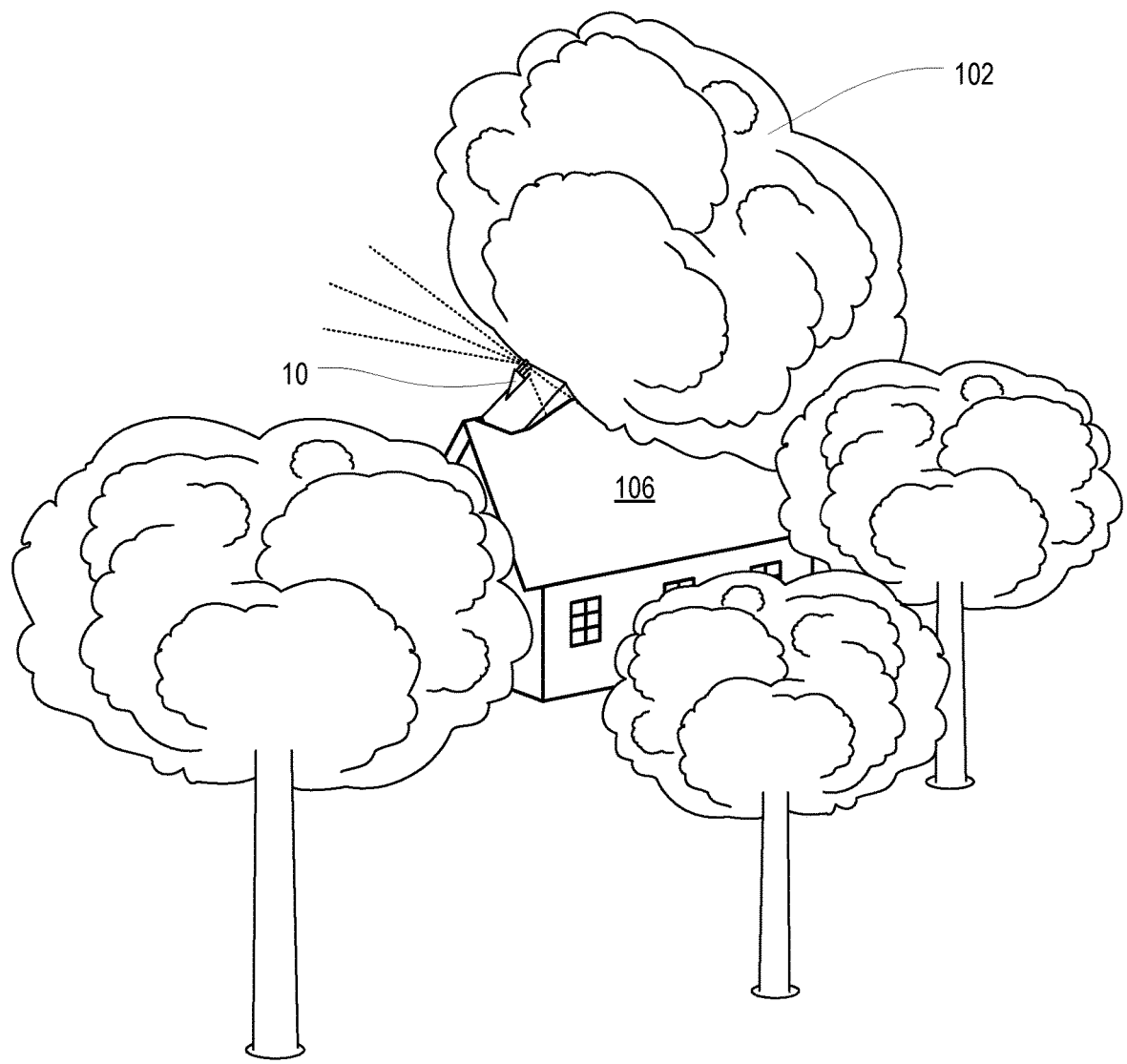
FIG. 13 is an environmental view similar to that of FIG. 12 but illustrating the alarm-equipped tree fallen onto the adjacent house.

Operation of the alarm 10 is illustrated in FIGS. 11-13. More particularly, FIG. 11 is an environmental view similar to that of FIG. 2 but illustrating the alarm-equipped tree 102 deviating only slightly from the vertical orientation. In this state, the tree 102 has not leaned or "tilted" sufficiently for the tilt sensor switch 32 to close, and thus the circuit remains non-energized and the alarm devices 38,40 remain off. FIG. 12 is an environmental view similar to that of FIG. 11 but illustrating the alarm-equipped tree 102 leaning sufficiently to trigger the alarm devices 38,40. In other words, the angular amount a of the tree's "lean" has reached the trigger value, thereby closing the trigger sensor switch 32 and activating the alarm devices 38,40. Once activated, the alarm devices 38,40 provide a visible and audible warning to people nearby (in the immediate vicinity) that the tree 102 is in danger of falling. In this regard, the alarm devices 38,40 are preferably of a type that provides instantaneous activation. Also, the outputs produced alarm devices 38,40 are preferably of a magnitude that passersby and even residents in one or more nearby houses 106 are able to perceive the alarms and take evasive action. The alarm devices 38,40 may indicate that the tree 102 is swaying wildly (perhaps during a wind storm), or has lost stability (perhaps due to a loosened root base) and is leaning precariously, in which case the residents or passersby may be given more time to react. However, even if the alarm devices 38,40 are not activated until moments before the tree falls, residents or passersby may still be able to react by ducking or otherwise assuming a protective position in order minimize injury. This may be particularly important if the tree 102 falls as shown in FIG. 13, which is an environmental view similar to that of FIG. 12 but illustrating the alarm-equipped tree 102 fallen onto the adjacent house 106. The activated alarm devices 38,40 may also serve to startle and scare pets or other animals sufficiently to cause them to move away from the alarm-equipped tree 102, thereby offering them a measure of protection as well.

Notably, the mere presence of a tree alarm 10 by itself may provide psychological comfort to a resident who either has a normal or heightened concern or fear of falling trees, including those suffering from dendrophobia. During storms or the like, and particularly when visibility is poor, residents often become anxious as they hear or otherwise experience strong winds, heavy rains, or the like, and their thoughts often turn to the trees 101 outside. So long as the alarm devices 38,40 have not been activated, the residents are reassured that the tree or trees 102 equipped with tree alarms 10 are not swaying or leaning excessively.

Figure 14:
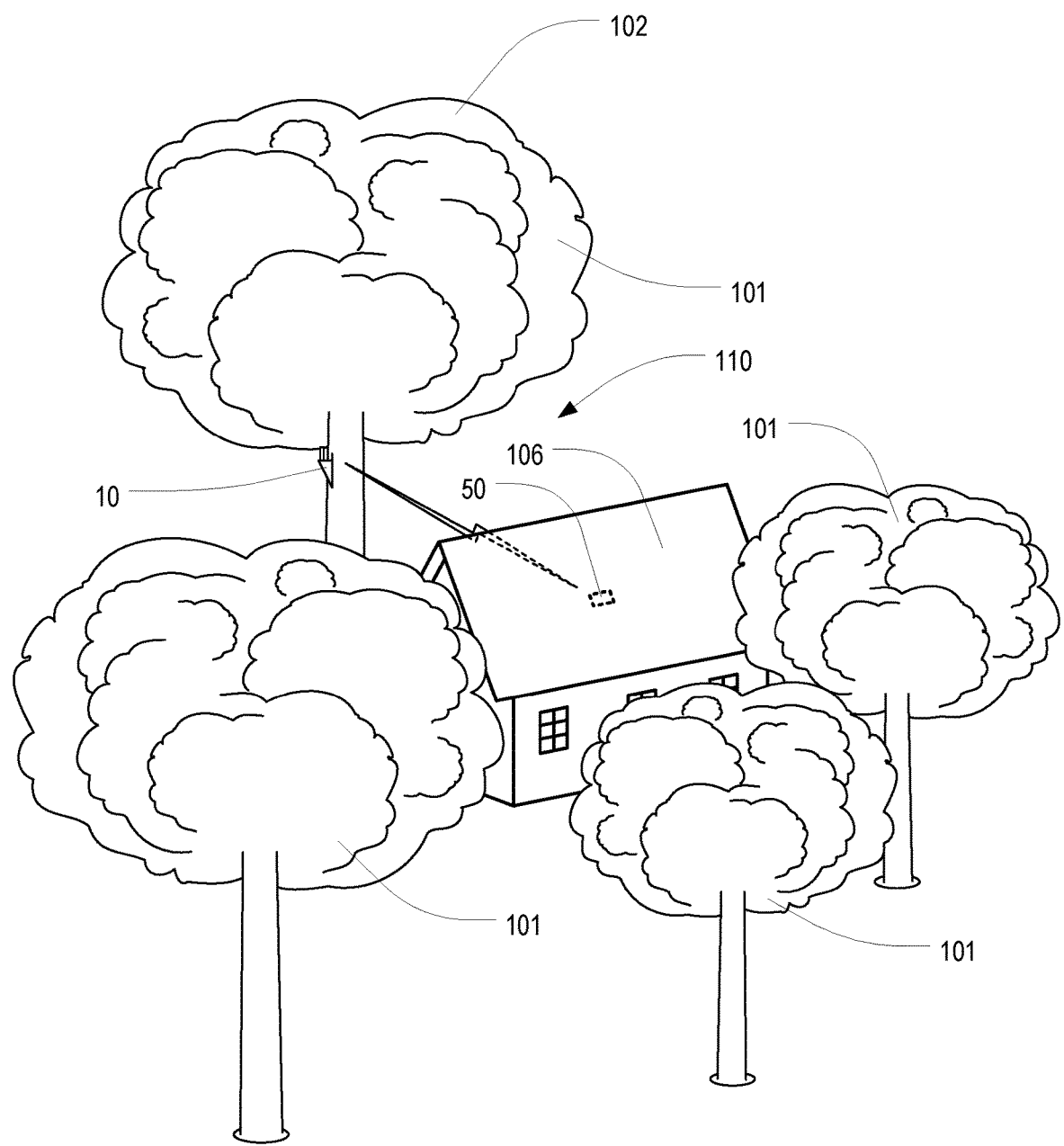
FIG. 14 is an environmental view similar to that of FIG. 2 but illustrating an alert signal being transmitted to a separate alarm device located inside the house.

Although not specifically illustrated, it will be appreciated that the tilt-tree vicinity alarm 10 of the present invention may be modified in a variety of ways to provide additional functionality. For example, a timer may be provided such that the alarm devices 38,40 are activated only for a limited period of time, such as 60 seconds. Such a timer may be a dedicated device or circuit element, or may be incorporated into a microprocessor or microcontroller. Use of small computer devices also makes it possible or easier to provide a variety of additional controls and features. Additional controls and features that may be provided in various embodiments include, without limitation, establishing different threshold values, setting an activation period, use of a low battery indicator (such as a flashing light, chirp, or the like), and/or use of a push-to-test button. In some embodiments, a transmitter may be provided to send an alert signal, which may be an alert signal sent directly to a local area network (including via WiFi) or to a cellular network, or may be a signal to a separate receiver that is itself connected to a local area network, cellular network, or the like. In some embodiments, a tree alarm 10 may be coupled with one or more separate alarm device 50 in a tilt-tree vicinity alarm system 110. In this regard, FIG. 14 is an environmental view similar to that of FIG. 2 but illustrating an alert signal being transmitted to a separate alarm device 50 located inside the house 106. Communication may be direct, as illustrated in FIG. 14, or may be indirect via an existing or purpose-built network. As with the alarm devices 38,40 of the tree alarm 10, such additional alarm device(s) 50 provides people in the immediate vicinity of the tree 102 with a warning of the tree 102 falling, or being at risk of falling. Notably, although not illustrated, such additional alarm device(s) 50 could additionally or alternatively be placed on an adjacent property, such as in an adjacent house, to provide protection, assurance, and the like to neighbors that might be affected by the tree 102.

In various embodiments, the tilt-tree vicinity alarm 10 of the present invention provides various advantages. For example, such an alarm 10 lowers the ISA risk rating due to its ability to alert people of a falling tree in situations where individuals cannot see the tree directly, such as when a clear line of sight cannot be established from inside a house, or at night when vision is compromised. Furthermore, the presence of an alarm 10 provides visual, mental, and emotional reassurance to people who suffer from anxiety during storms or who suffer from even mild symptoms of dendrophobia or related phobias, similar to the reassurance provided by the presence of smoke alarms in a building. Still further, an alarm 10 monitors not only whether a tree is actively falling but also whether the tree has permanently changed, such as from damage to the tree, or temporarily, such as during very windy conditions. Such conditions increase the likelihood of failure and affect at least one of the factors of the ISA risk rating.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A tilt-tree vicinity alarm system, comprising: (a) an operational unit, including: (i) a housing, (ii) a tilt sensor, disposed in the housing, having an orientation and adapted to serve as or control a switch in an electric circuit, (iii) a first instantaneous vicinity alarm device, disposed together with the tilt sensor in the same housing, that is triggered by operation of the tilt sensor switch and that instantaneously generates an alarm that is perceptible to individuals in the immediate vicinity of the operational unit when the instantaneous vicinity alarm device is triggered, and (iv) a transmitter, connected to the tilt sensor switch, that instantaneously sends a short-range alert signal to a local receiver when triggered by operation of the tilt sensor switch; (b) a mounting system, supporting the operational unit, attached to the tree in prominent visual disposition thereon, the tree being located on a real estate property; and (c) a stationary separate unit, placed elsewhere on the real estate property, that includes the local receiver coupled with a second alarm device, the local receiver and the second alarm device being stationary in their placement elsewhere on the real estate property, wherein the stationary local receiver receives the short-range alert signal and, in response, generates an instantaneous alarm, via the stationary second alarm device, that is perceptible to individuals in the immediate vicinity of the stationary local receiver and stationary second alarm device when the short-range alert signal is received;
  wherein the local receiver and second alarm device are stationed inside a residence on the real estate property; and
  wherein the transmitter further sends the short-range alert signal to a second local receiver coupled a third alarm device stationed inside a second residence on a second real estate property.

2. The tilt-tree vicinity alarm system of claim 1, wherein the transmitter is disposed together with the tilt sensor and the first instantaneous vicinity alarm device in the same housing.

3. The tilt-tree vicinity alarm system of claim 1, wherein the instantaneous alarm is sufficient, by itself, to alert at least one individual in the immediate vicinity of the separate alarm device of the imminent tree-falling danger due to at least one natural cause.

4. The tilt-tree vicinity alarm system of claim 1, wherein the instantaneous alarms generated by the first and second alarm devices are each broadcast alarms that are perceptible to residents and passersby.

5. The tilt-tree vicinity alarm system of claim 4, wherein the instantaneous alarms generated by the first and second alarm devices are each projected in multiple directions from the respective alarm device so as to be perceptible by individuals in multiple directions and at multiple distances from the respective alarm device.

6. The tilt-tree vicinity alarm system of claim 4, wherein each of the first and second alarm devices includes a visual alarm device.

7. The tilt-tree vicinity alarm system of claim 6, wherein the visual alarm device includes a light that projects in multiple directions so as to attract the attention of the individuals in the immediate vicinity of the operational unit.

8. The tilt-tree vicinity alarm system of claim 6, wherein the visual alarm device includes a light that flashes so as to attract the attention of the individuals in the immediate vicinity thereof.

9. The tilt-tree vicinity alarm system of claim 1, wherein each of the first and second alarm devices includes an audible alarm device.

10. The tilt-tree vicinity alarm system of claim 9, wherein the audible alarm device includes a speaker that projects sound in multiple directions so as to attract the attention of the individuals in the immediate vicinity of the operational unit.

11. The tilt-tree vicinity alarm system of claim 9, wherein the audible alarm device includes a speaker that sounds intermittently so as to attract the attention of the individuals in the immediate vicinity of the operational unit.

12. The tilt-tree vicinity alarm of claim 1, further comprising a timer, wherein the timer controls an activation period during which the first and second alarm devices generate their respective alarms such that once the activation period ends, the first and second alarm devices stop generating the alarms.

13. A tilt-tree vicinity alarm system, comprising: (a) an operational unit, including: (i) a housing, (11) a tilt sensor, disposed in the housing, having an orientation and adapted to serve as or control a switch in an electric circuit, (ii) a transmitter, connected to the tilt sensor switch, that instantaneously sends a short-range alert signal to a local receiver when triggered by operation of the tilt sensor switch; (b) a mounting system, supporting the operational unit, attached to the tree in prominent visual disposition thereon, the tree being located on a residential real estate property; and (c) a stationary separate unit, stationed inside a residence on the real estate property, that includes the local receiver coupled with an instantaneous vicinity alarm device, the local receiver and the alarm device being stationary in their placement inside the residence, wherein the stationary local receiver receives the short-range alert signal and, in response, generates an instantaneous alarm, via the stationary alarm device, that is perceptible to individuals inside the residence when the short-range alert signal is received; and
  wherein the transmitter further sent the short-range alert signal to a second local receiver coupled with a second alarm device stationed inside a second residence on a second real estate property.

14. A method of providing instantaneous tilting tree alerts to residents and passersby
  via a tilt-tree vicinity alarm system, the method comprising:
  (a) installing an operational unit, via a mounting system, in prominent visual disposition on a tree located on a residential real estate property, the operational unit including:
    (i) a housing,
    (ii) a tilt sensor, disposed in the housing, having an orientation and adapted to serve as or control a switch in an electric circuit,
    (iii) a first instantaneous vicinity alarm device, disposed together with the tilt sensor in the same housing, that is triggered by operation of the tilt sensor switch and that instantaneously generates an alarm that is perceptible to individuals in the immediate vicinity of the operational unit when the instantaneous vicinity alarm device is triggered, and
    (iv) a transmitter, connected to the tilt sensor switch, that instantaneously sends a short-range alert signal to a local receiver when triggered by operation of the tilt sensor switch;
  (b) placing a stationary separate unit in a stationary location inside a residence on the real estate property, the separate unit including:
    (i) the local receiver, and
    (ii) a second alarm device coupled with the local receiver;
  (c) when triggered by operation of the tilt sensor switch:
    (i) by the first alarm device, instantaneously broadcasting a first alarm, including visual and audible components, that is projected in multiple directions and is perceptible by residents and passersby at any of various distances in the immediate vicinity of the first alarm device, and
    (ii) by the transmitter, instantaneously sending a short-range alert signal to the local receiver of the stationary separate unit, located inside the residence;
  (d) receiving the short-range alert signal at the local receiver of the stationary separate unit, located inside the residence; and
  (e) by the second alarm device and in response to the local receiver receiving the short-range alert signal, instantaneously broadcasting a second alarm, including visual and audible components, that is projected in multiple directions and is perceptible by a person inside the residence; and
  wherein the transmitter further sent the short-range alert signal to a second local receiver coupled to a third alarm device stationed inside a second residence on a second real estate property.

\* \* \* \* \*